United States Patent [19]
Nelson

[11] Patent Number: 5,302,084
[45] Date of Patent: Apr. 12, 1994

[54] WINDMILL WITH ANNULAR FLYWHEEL

[76] Inventor: Wilbert B. Nelson, Rte. 2, Box 87, Sandstone, Minn. 55072

[21] Appl. No.: 998,451

[22] Filed: Dec. 30, 1992

[51] Int. Cl.⁵ ............................................. F03D 7/06
[52] U.S. Cl. ......................................... 416/17; 416/113; 416/116; 416/119; 416/DIG. 4; 415/4.2; 384/549; 384/619
[58] Field of Search .................. 416/17, 112, 113, 114, 416/116, 118, 119, DIG. 4; 415/4.2, 4.4, 907; 384/549, 619

[56] References Cited

U.S. PATENT DOCUMENTS

| | | | |
|---|---|---|---|
| 223,308 | 1/1880 | Barker | 416/119 |
| 259,569 | 6/1882 | McLachlan | 415/4.2 |
| 384,232 | 6/1988 | Brodrick | 416/119 |
| 1,074,011 | 9/1913 | Partain | 416/118 |
| 1,441,774 | 1/1923 | Adams . | |
| 1,536,968 | 6/1924 | Palm . | |
| 4,104,536 | 8/1978 | Gutsfeld . | |
| 4,178,126 | 12/1979 | Weed . | |
| 4,245,958 | 1/1981 | Ewers . | |
| 4,321,005 | 3/1982 | Black . | |
| 4,486,143 | 12/1984 | McVey . | |
| 4,496,283 | 1/1985 | Kodric | 416/119 |
| 4,566,853 | 1/1986 | Likitanupak . | |
| 4,818,888 | 4/1989 | Lenoir, III | 416/118 |
| 5,057,696 | 10/1991 | Thomas . | |

FOREIGN PATENT DOCUMENTS

| | | |
|---|---|---|
| 3602414 | 7/1987 | Fed. Rep. of Germany . |
| 0186069 | 11/1982 | Japan . |
| 1373859 | 2/1988 | U.S.S.R. . |

*Primary Examiner*—Edward K. Look
*Assistant Examiner*—Christopher Verdier
*Attorney, Agent, or Firm*—Merchant, Gould, Smith, Edell, Welter & Schmidt

[57] ABSTRACT

An improved windmill has an approximately vertical center support post. The windmill also has a plurality of wheels, each rotatably mounted on a separate horizontal axis, each axis being radially disposed about the center support post. The windmill also has a horizontal annular ring disposed radially about the center support post. The ring is mounted on the wheels so that the ring can rotate about the center support post. The windmill also includes a plurality of approximately horizontal beams. Each beam is radially disposed about the center support post. A first end of each beam is connected to the center support post and a second end of each beam is connected to the annular ring.

4 Claims, 11 Drawing Sheets

WINDMILL WITH ANNULAR FLYWHEEL

FIELD OF THE INVENTION

The present invention relates to an improved windmill for the conversion of wind energy into electrical energy.

BACKGROUND OF THE INVENTION

The present invention is directed to a windmill for generating electrical energy. It is well known that air pollution from coal-burning and fossil fuel electric generating plants is destroying forests and fields and killing lakes. Another source of electrical power, nuclear power plants, have certain real and perceived safety problems which have caused significant public anxiety. The damming of rivers for water power has the disadvantage of interfering with the life cycle of certain wildlife, such as migrating salmon populations.

U.S. Pat. No. 1,536,968 to Palm shows an early attempt at harnessing wind energy. The '968 patent discloses a horizontally rotating windmill having four horizontal curved beams spaced at approximately 90° about a vertical pivot. Each beam has a plurality of hinged flaps or wind vanes which pivot to a closed position creating a substantially continuous surface to catch wind blowing toward a first side of the beam. If wind is blowing from opposite the beam, the flaps open allowing the wind to pass between the flaps. Wind pushing against the closed flaps forces the beams to rotate about the vertical pivot. The vertical pivot is connected to a belt chain or gear drive transferring energy to a generator or other machinery.

Soviet Patent No. SU 1373859, issued Feb. 15, 1988, discloses a windmill having a rotating circular ring which is supported for rotation a plurality of radially spaced wheels. The wheels are connected to adjacent generators.

The windmills disclosed by the patents above, however, do not disclose safety devices for preventing damage to the windmill caused by excessive winds or snow.

SUMMARY OF THE INVENTION

The present invention pertains to an improved windmill comprising a proximately vertical center support post. The windmill also has a plurality of wheels. Each wheel is rotatably mounted on a separate horizontal axis which is radially disposed about the center support post. The windmill also includes a horizontal annular ring which is disposed radially about the center support post. The ring is mounted on the wheels for rotation about the center support post.

Operably connected to the center support post are a plurality of proximately horizontal beams radially disposed about the center support post. Each beam has a first end and a second end, the first end being operably connected to a center post and the second end of each beam being operably connected to the annular ring.

Mounted to each beam are a plurality of wind vanes, each pivotably attached about a proximately vertical axis to the beam. The windmill also includes a tripping lever for alternately placing the vanes in a confined condition, in which each vane can rotate approximately 180° about the vertical axis, to an unconfined condition, in which each vane can rotate approximately 360° about the vertical axis.

DETAILED DESCRIPTION OF THE PREFERRED EMBODIMENT

Figure 1:
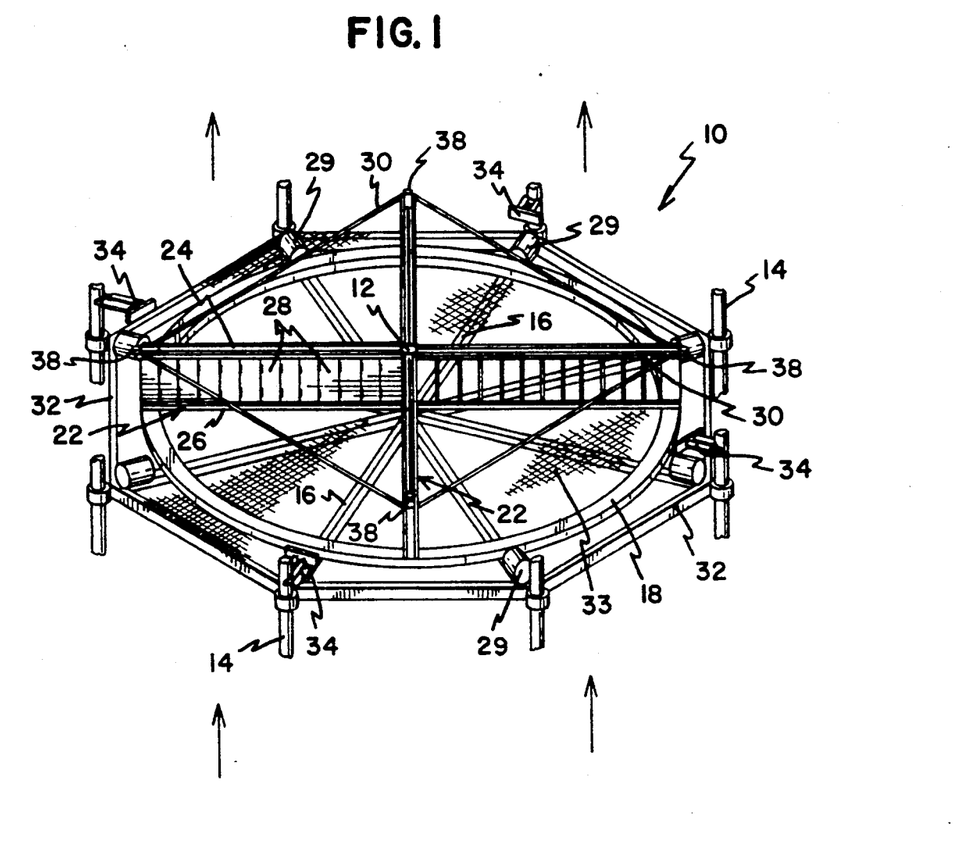
FIG. 1 shows a perspective view of a windmill in accordance with the present invention.

Referring now to the figures wherein like reference numerals designate identical or corresponding parts throughout the several figures. Shown in FIG. 1 is a drawing of an improved windmill, in accordance with the present invention, the windmill being generally designated by the numeral 10. Windmill 10 has a vertical center support post 12 rotatably mounted to a support means including radial support posts 14 and support beams 16.

In the preferred embodiment, the support means also includes support beams 32 disposed at approximately the same elevation as support beams 16. Support beams 32 are operably connected to adjacent radial support post 14. The support means is, however, not essential and the various other elements of windmill 10 could be installed on an at-grade foundation. Operably connected to, and preferably disposed above, support beams 16 and 32 is a wire mesh or grate service platform 33.

The windmill 10 also includes a horizontal annular ring 18 mounted atop a plurality of radially spaced wheels 20 (not shown in FIG. 1, but shown in FIGS. 3A and 3B and discussed below). Each wheel 20 is operably rotatably connected to a generator 29.

Preferably, the windmill 10 includes four beams 22 radially disposed about center support post 12, although fewer or more beams 22 could be used. Each beam 22 has a first end operably connected to post 12 and a second end operably connected to and supported by annular ring 18. Each beam 22 also preferably has an upper member 24 and a lower member 26. Pivotally mounted between upper member 24 and lower member 26 of each beam 22 are a plurality of wind vanes 28. Each beam 22 is tied proximate its second end at its upper member 24 to the adjacent beam 22 with a beam tie 30.

The windmill 10 has a tripping means for alternately placing the vanes 28 in a first confined condition in which each vane 28 can rotate approximately 180° about the vertical axis to a second free condition, wherein each vane can rotate approximately 360° about a vertical axis. The tripping means include at least one trip lever 34 operably connected to one radial support post 14 and preferably disposed at approximately the same elevation as upper members 24 of beams 22. In the preferred embodiment, four trip levers 34 or 34' are operably connected to radial support post 14 spaced at approximately 90° about center support post 12, as shown in FIG. 1. The tripping means also include a plurality of vane release slides 36 and 37 (not shown in FIG. 1, but shown in FIGS. 4A and B and discussed below). In the preferred embodiment of the invention, one vane release slide 36 is slidably mounted to each upper member 24 of beams 22 and one vane release slide 37 is slidably mounted to each lower member 26 of beams 22. The tripping means also include a plurality of rollers 38 or 38', one disposed at the second end of each beam 22. In the preferred embodiment, each roller is rotatably mounted to the proximate end of the vane release slide 36 slidably mounted to upper member 24 of beams 22.

Figure 2:
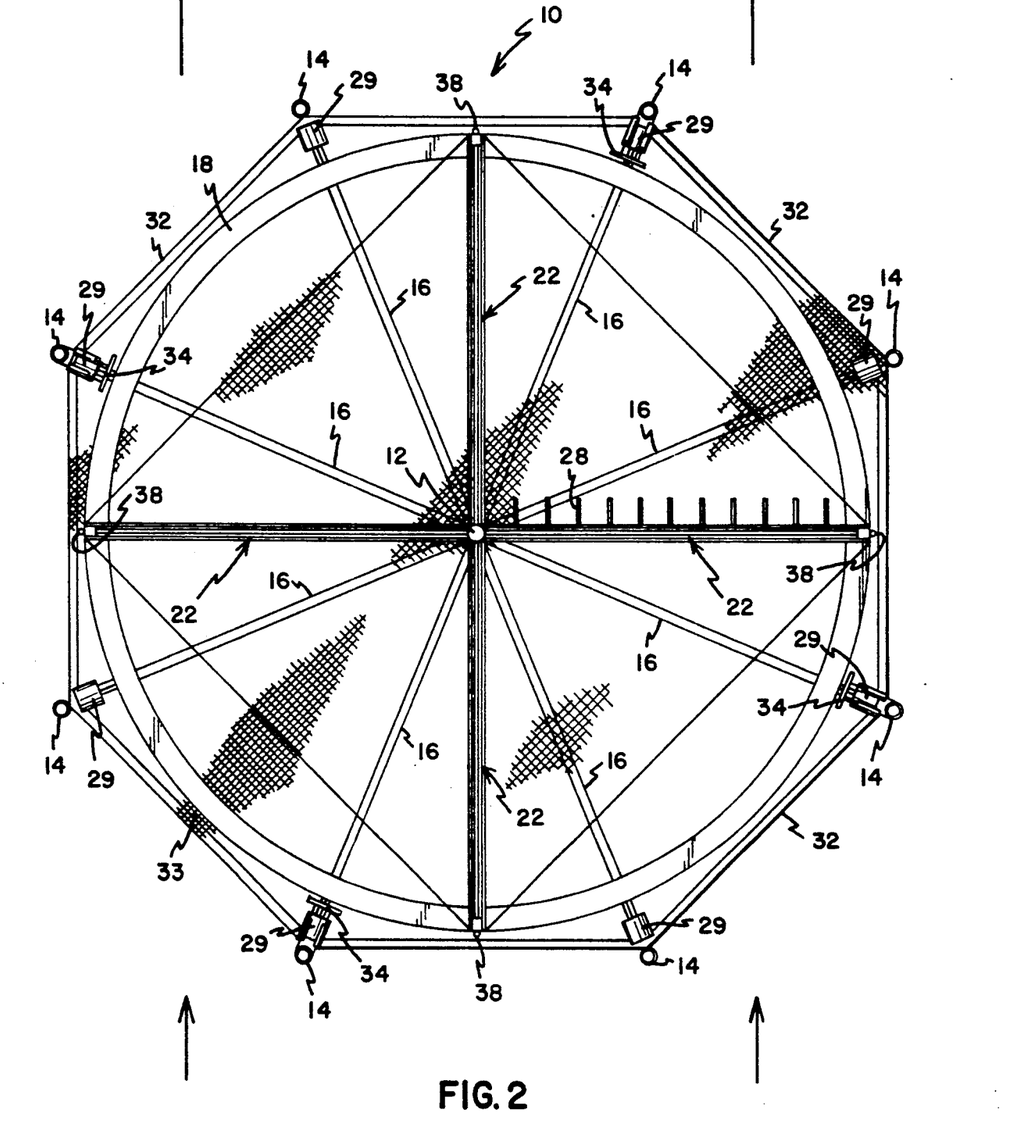
FIG. 2 shows a top view of the windmill in accordance with the present invention.

FIG. 2 is a top schematic view of windmill 10. Four beams 22 are shown radially disposed about center support 12, with a first end of each beam 22 operably connected to the center support. FIG. 2 also shows generators 29 disposed radially about center support post 12 proximate radial support posts 14. Support beams 16 are shown radially disposed about center support post 12 and support beams 32 are shown operably connecting adjacent radial support posts 14. Annular ring 18 is shown supporting the second ends of beams 22, and wire mesh surface 33 is disposed below annular ring 18.

As shown in FIG. 2, wind vanes 28 are in an open position on the beam 22 on the right hand side of the figure. Wind vanes 28 on the other three beams 22 are closed and not visible in FIG. 2. The position of wind vanes 28 in FIG. 2 corresponds to the position of the wind vanes 28 shown in FIG. 1.

Figure 3A:
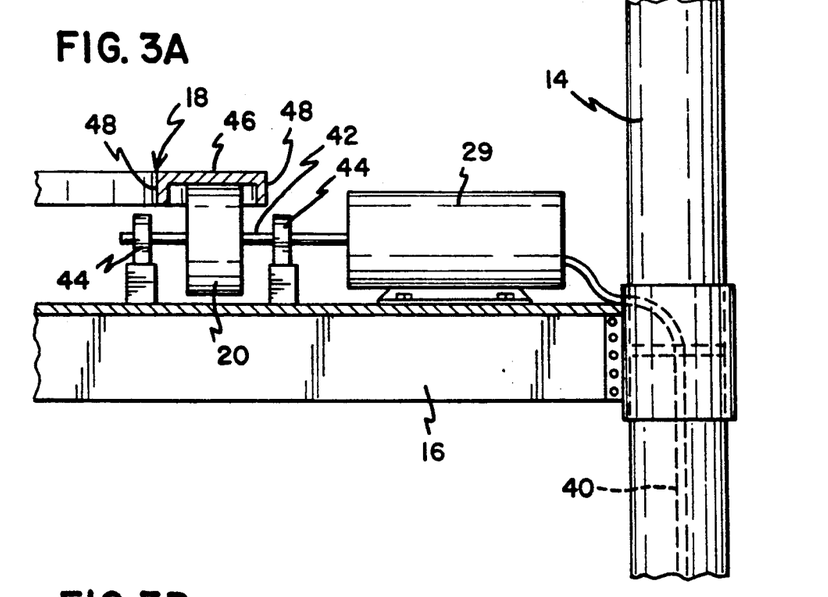
FIG. 3A shows a cross-sectional view of an annular ring and wheel.

FIG. 3A shows a generator 29 mounted on support beam 16 proximate support post 14. As understood by one skilled in the art, an alternator could be substituted for generator 29. Extending from generator 29 is a bus 40 leading to a location where the electrical power generated will be consumed or stored. Disposed to the opposite side of generator 29 is wheel 20 mounted to a shaft 42 rotatably mounted on bearings 44 which, in turn, are mounted on beam 16. Shaft 42 can be connected directly to generator 29 as shown or can be operably connected to generator 29 through a series of belts and pulleys or gears.

Resting atop wheel 20 is annular ring 18. Annular ring 18 preferably has a channel-like cross-section having a top side 46 resting on wheel 20 and two vertical sides 48 disposed on opposite sides of wheel 20. Annular ring 18 should be constructed of a material sufficiently sturdy to support beams 22 and heavy enough to act as a flywheel.

Figure 3B:
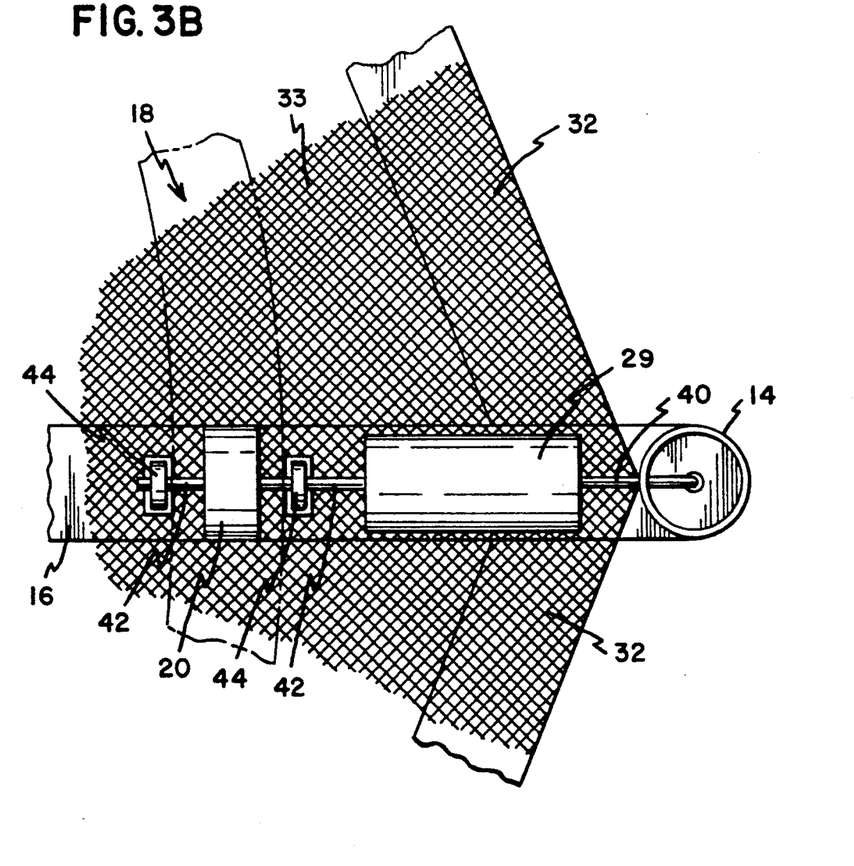
FIG. 3B shows a top view of the annular ring and wheel.

FIG. 3B shows a top view of the generator 29 mounted to support beam 16 proximate support post 14. FIG. 3B also shows mesh 33 disposed below annular ring 18 (shown in broken line) and above support beam 16 and support beams 32. Bus 40 is shown disposed to one side of generator 29 and shaft 42 is shown disposed to the opposite side. Wheel 20 is shown mounted to shaft 42 which is rotatably mounted on bearings 44.

Figure 4A:
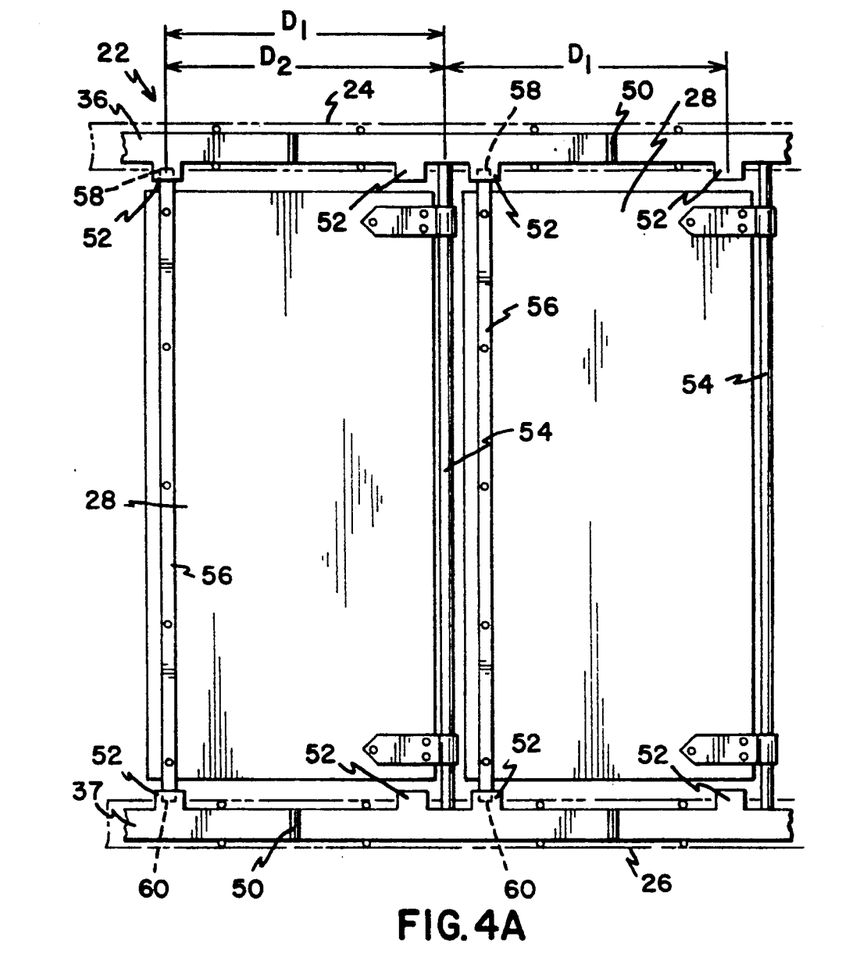
FIG. 4A shows a segment of a beam having the vane release slides in a first position.
Figure 4B:
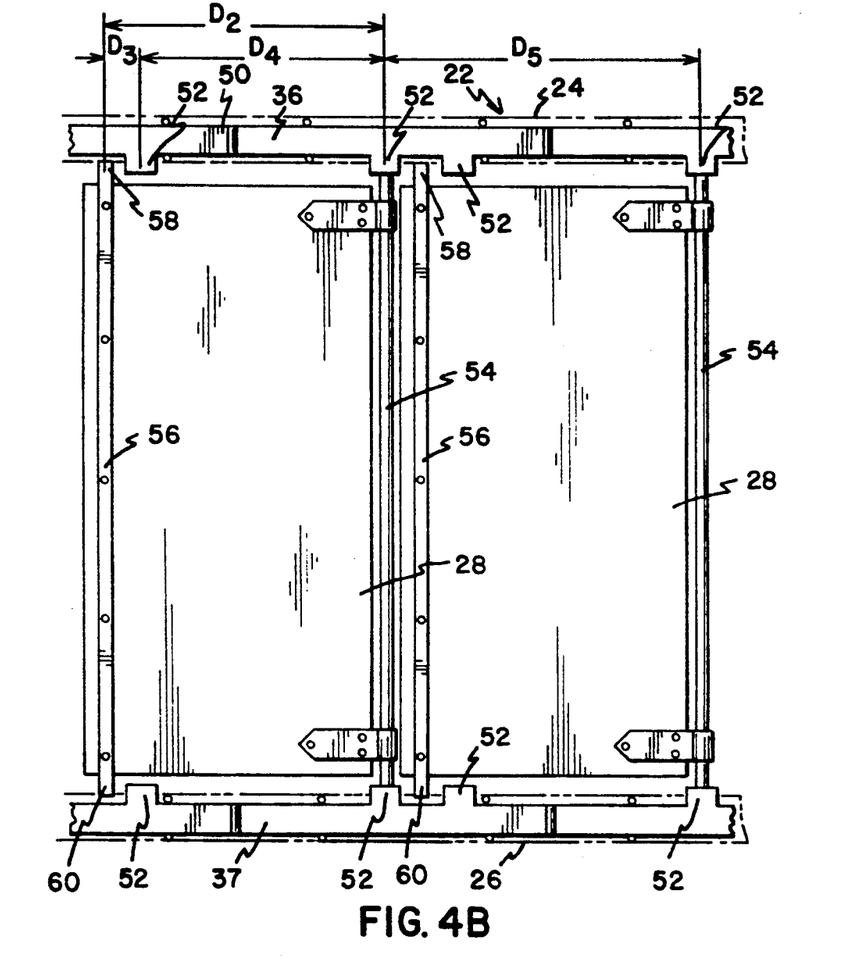
FIG. 4B shows a portion of the beam having the vane release slides in a second position.

FIG. 4A shows a portion of beam 22 having upper member 24 and lower member 26. An upper vane release slide 36 is slidably mounted to upper member 24 and a lower vane release slide 37 is slidably mounted to lower member 26. Slides 36 and 37 are operably connected by means for connecting which allows slide 36 and 37 to slid in unison. Vane release slides 36 and 37 are slidably mounted to upper member 24 and lower member 26, respectively, with bearing means 50. Vane release slides 36 and 37 have a plurality of tabs 52 disposed toward wind vanes 28.

FIG. 4A shows two wind vanes 28 pivotally mounted to upper and lower members 24 and 26 by vertical rods 54. A vertical stay 56 is operably connected to wind vane 28 opposite vertical rod 54. An upper end 58 of stay 56 is disposed above vane 28 and below upper member 24. A lower end 60 of stay 56 is disposed below vane 28 and above lower member 26.

As shown in FIG. 4A, the vane release slides 36 and 37 are in a first confined position where horizontal distance $D_1$ between vertical rod 54 and the second tab 52 to the left and to the right is equal to the distance $D_2$ between vertical rod 54 and stay 56. When vane release slides 36 and 37 are in the first confined position, as shown in FIG. 4A, vanes 28 are in a confined condition, free to rotate only approximately 180° about a vertical axis through vertical rod 54. In particular, vane 28 can rotate from a first position, wherein upper end 58 and lower end 60 of stay 56 are engaged with the second tabs 52 to the left of rod 54 to a second position, wherein upper end 58 and lower end 60 are engaged with the second tabs 52 to the right of rod 54.

FIG. 4B shows a portion of beam 22 having upper member 24 and lower member 26. In FIG. 4B, vane release slides 36 and 37 mounted to upper member 24 and lower member 26 are in a second free position, wherein slides 36 and 37 have been slid horizontally to the right a distance $D_3$. In the second free position, tabs 52 of beam release slides 36 and 37 are not engaged with upper end 58 and lower end 60, respective, of stay 56. The distance $D_4$, between vertical rod 54 and the first tabs 52 to the left of vertical rod 54, is less than the horizontal distance $D_2$ between vertical rod 54 and upper end 58 and lower end 60 of stay 56 by the distance $D_3$. The distance $D_5$, between vertical rod 54 and the second tabs 52 to the right, is greater than the distance $D_2$ by $D_3$. In the second free position, vanes 28 are in an unconfined condition and are free to rotate 360° about the vertical axis through rod 54 because tabs 52 no longer engage with upper ends 58, and lower end 60 of stays 56 after slides 36 and 37 have been moved distance $D_3$ to the right. It should be understood that reference to the left and right in FIGS. 4A and 4B are made for convenience of explanation only.

Figure 5A:
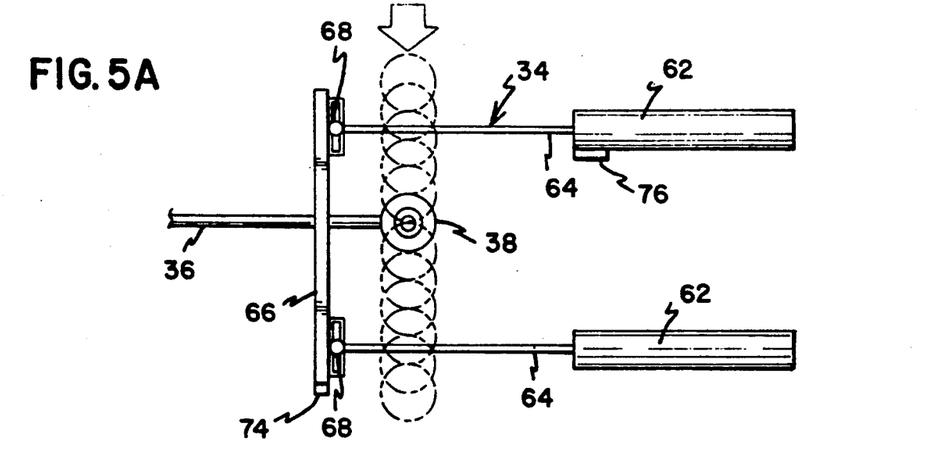
FIG. 5A shows a trip lever in a neutral position.

FIG. 5A shows trip lever 34 in a neutral position. A roller 38 is shown rotatably mounted to upper vane release slide 36. In a preferred embodiment of the invention, trip lever 34 is operably connected to radial support post 14. Trip lever 34 includes two air valves or solenoids 62. Extending from air valve 62 are actuator rods 64. Operably connected by hinges 68 to actuator rod 64 opposite valves 62 is a trip lever face 66. Trip lever face 66 must be deep enough that roller 38 can roll across face 66 from proximate one hinge 68 to proximate the other hinge 68. A roller sensor 74 is shown proximate the trailing end (that is the end which roller 38 passes last as beam 22 rotates) of trip lever face 66, and a trip lever sensor 76 shown proximate the opposite actuator rod 64.

Figure 5B:
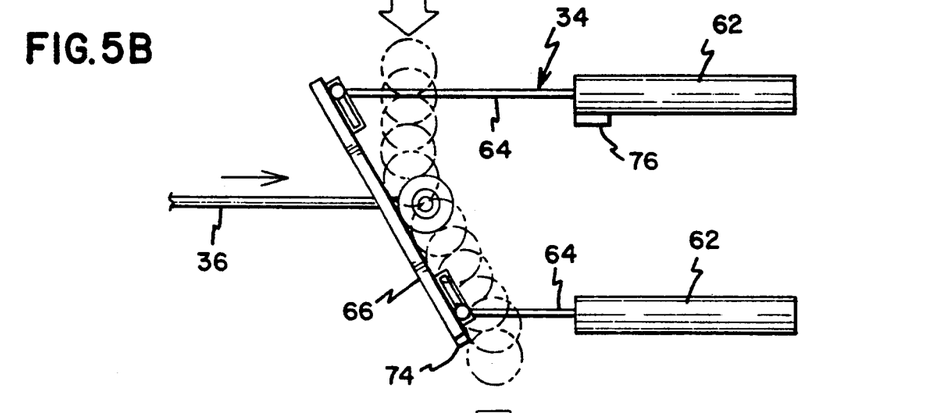
FIG. 5B shows the trip lever moving vane release slides to the second position.

FIG. 5B shows trip lever 34 having one actuator rod 64 retracted by one valve 62. In this position, trip lever 34 is sliding vane release slides 36 and 37 into the second free position as described above.

Figure 5C:
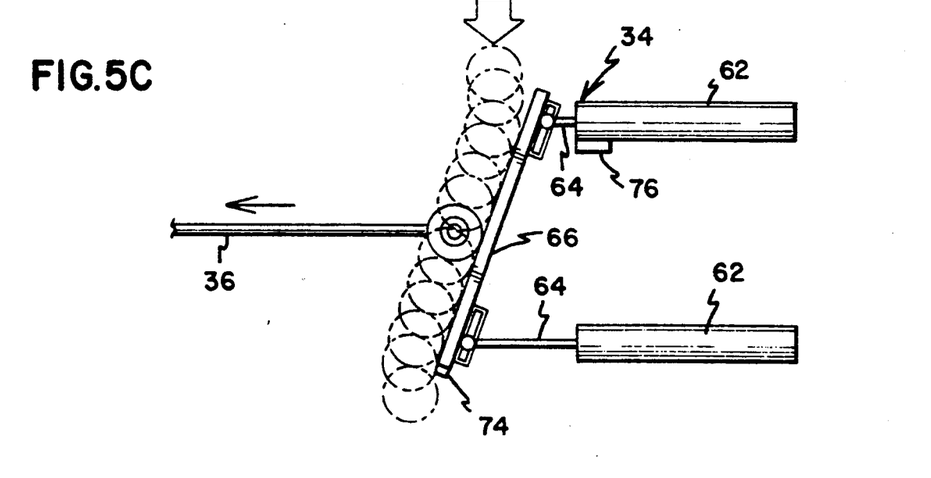
FIG. 5C shows the trip lever moving the vane release slides to the first position.

FIG. 5C shows one actuator rod 64 partially retracted by one valve 62 and another actuator rod 64 fully retracted by another air valve 62. In this position, trip lever 34 is returning release slides 36 and 37 to a confined position from the free position as described above.

Figure 6A:
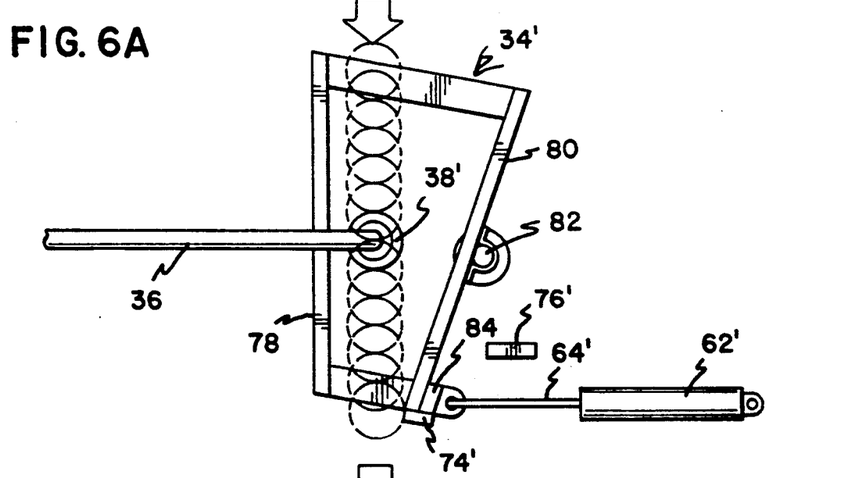
FIG. 6A shows an alternate embodiment of the trip lever in a neutral position.
Figure 6B:
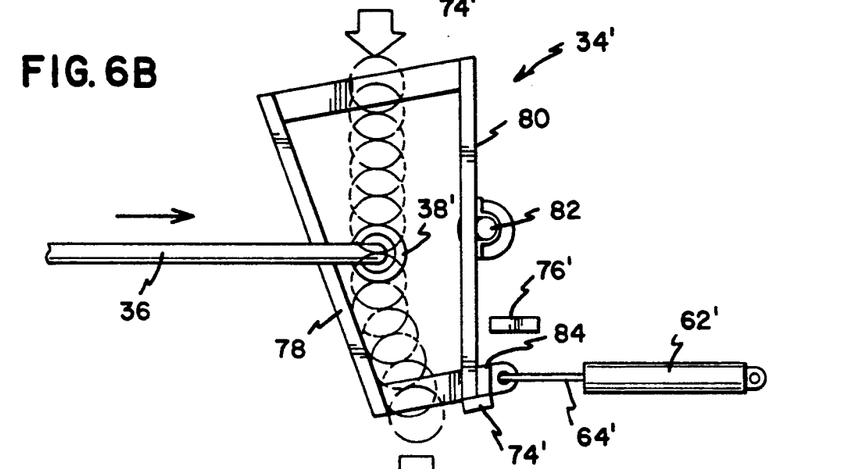
FIG. 6B shows the alternate embodiment of the trip lever moving the vane release slide into the second position.
Figure 6C:
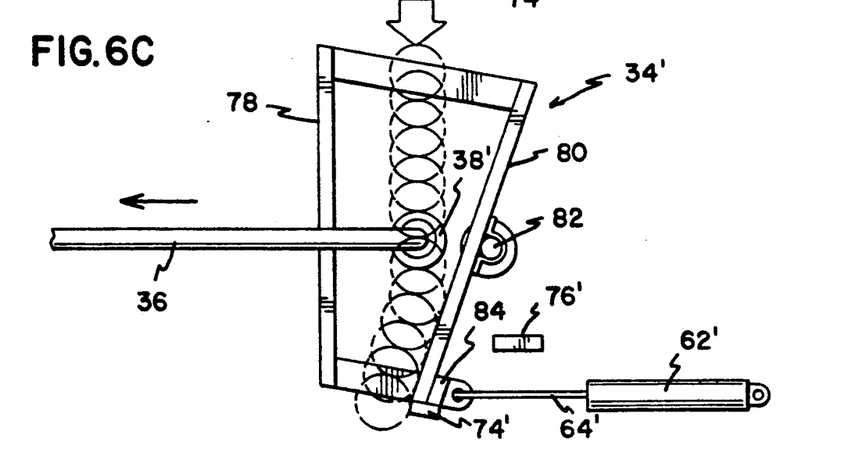
FIG. 6C shows the alternate embodiment of the trip lever moving the vane release slide into the first position.
Figure 7:
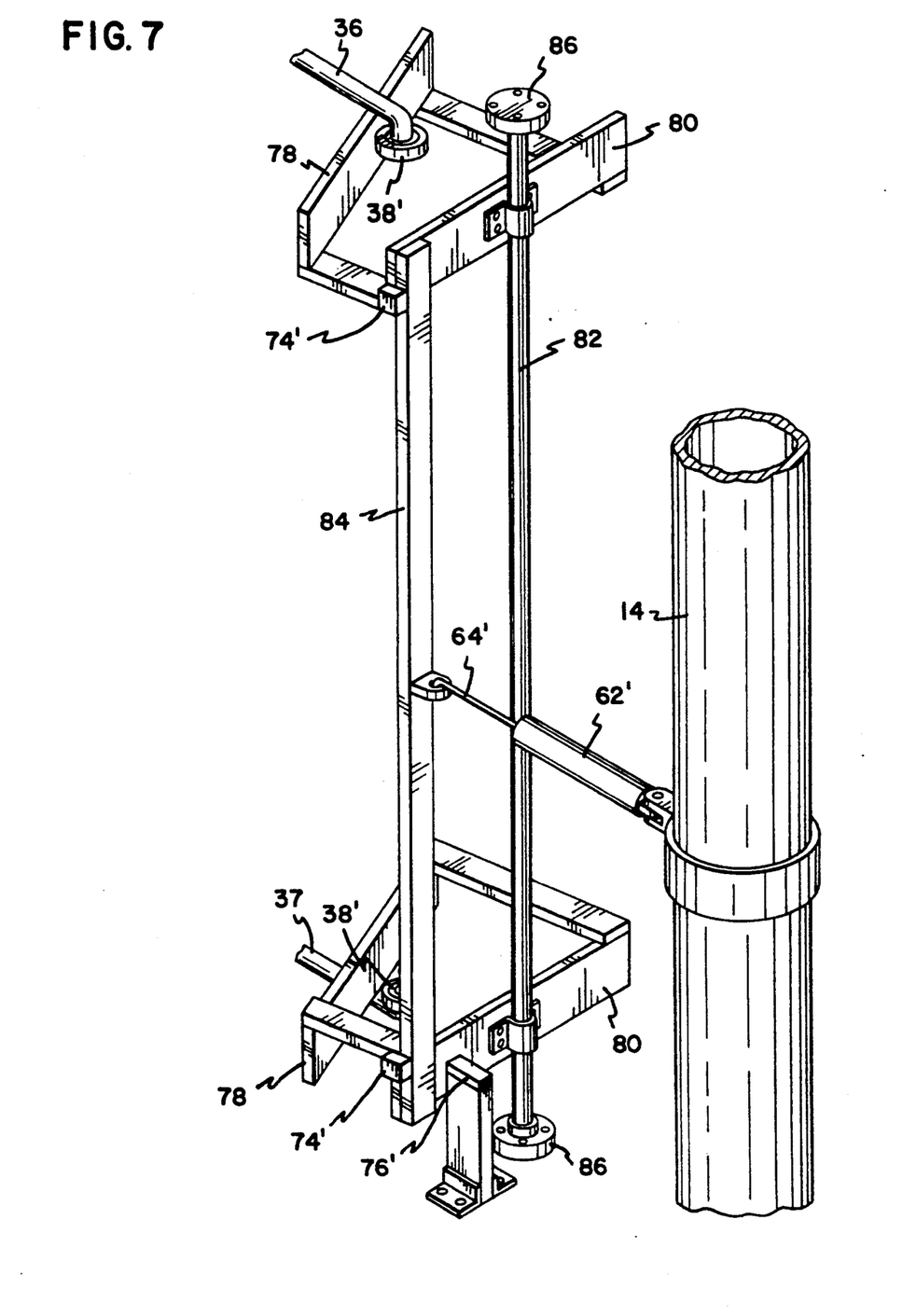
FIG. 7 shows a perspective view of the alternate embodiment of the trip lever.

FIGS. 6A, 6B, 6C and 7 show an alternate trip lever embodiment 34'. FIG. 7 shows a pair of trip levers 34' rotatably mounted to a pivot post 82 which is, in turn, mounted to support beam 16 with mounting brackets 86. The pair of trip levers 34' mounted to pivot post 82 are operably connected for cooperative movement by connecting member 84. An air valve 62' having an actuator rod 64' operably connects connection member 84 and radial support post 14. A roller 38' is disposed between each front face 78 and back face 80 of each trip lever 34'. One roller 38' is rotatably mounted to each upper vane release slide 36 and each lower vane release slide 37, as shown in FIG. 7. Note that vane release slides 36 and 37 could also be operably connected so that only one trip lever 38 or 38' would be needed rather than two, as shown in FIG. 7.

FIG. 6A shows trip lever 34' in a neutral position. A roller 38' is shown rotatably mounted to upper vane release slide 36. In a preferred embodiment of the invention, trip lever 34' includes air valve 62' or a solenoid or the like. A roller sensor 74' is shown proximate the trailing end of trip lever backface 80 and a trip lever sensor 76, is shown proximate actuator rod 64'.

FIG. 6B shows trip lever 34' having actuator rod 64' retracted by air valve 62'. In this position, trip lever 34' is sliding vane release slides 36 and 37 into the second free position, as described above.

FIG. 6C shows actuator rod 64' re-extended by valve 62'. In this position, trip lever 34' is returning release slides 36 and 37 to a confined position from the free position, as described above.

Figure 8:
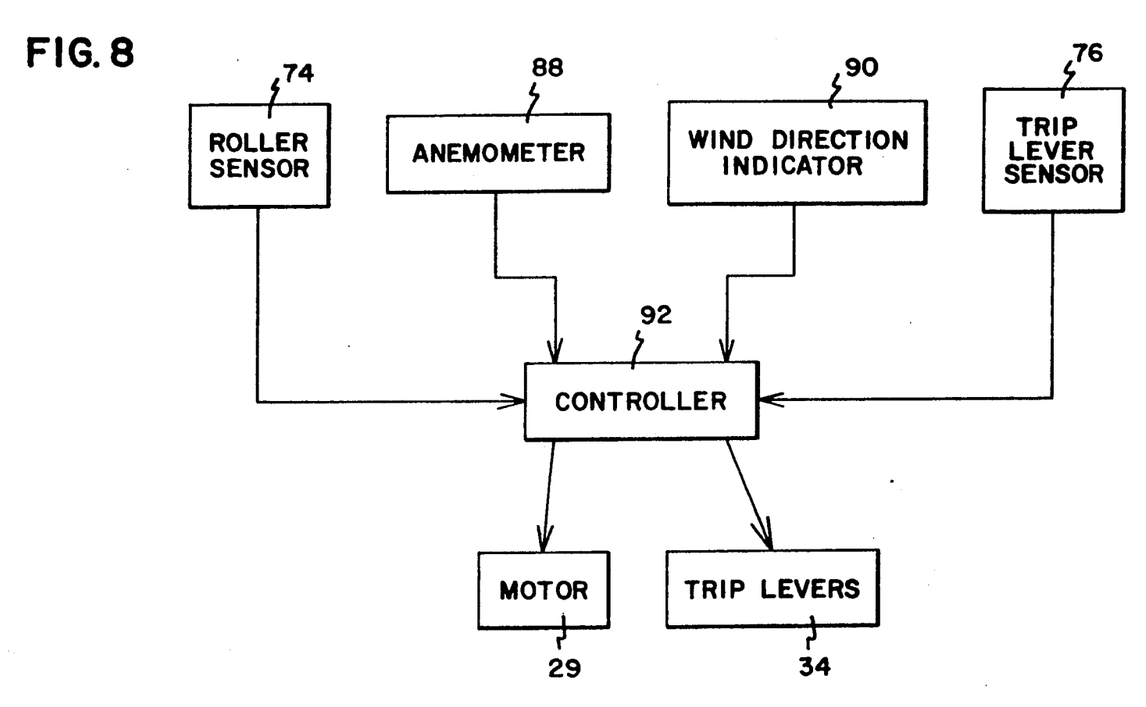
FIG. 8 shows a box diagram of the controller inputs and outputs.

As shown in FIG. 8, retraction and extension of actuator rods 64 or 64 by air valves 62 or 62' is controlled by a controller 92 for controlling a motor winding on at least one generator 29 and the air valves 62 or 62' for trip levers 34 or 34', respectively. The controller 92 receives input signals from roller sensors 74 or 74', trip lever sensors 76 or 76', anemometer 88, and wind direction indicator 90.

Figure 9:
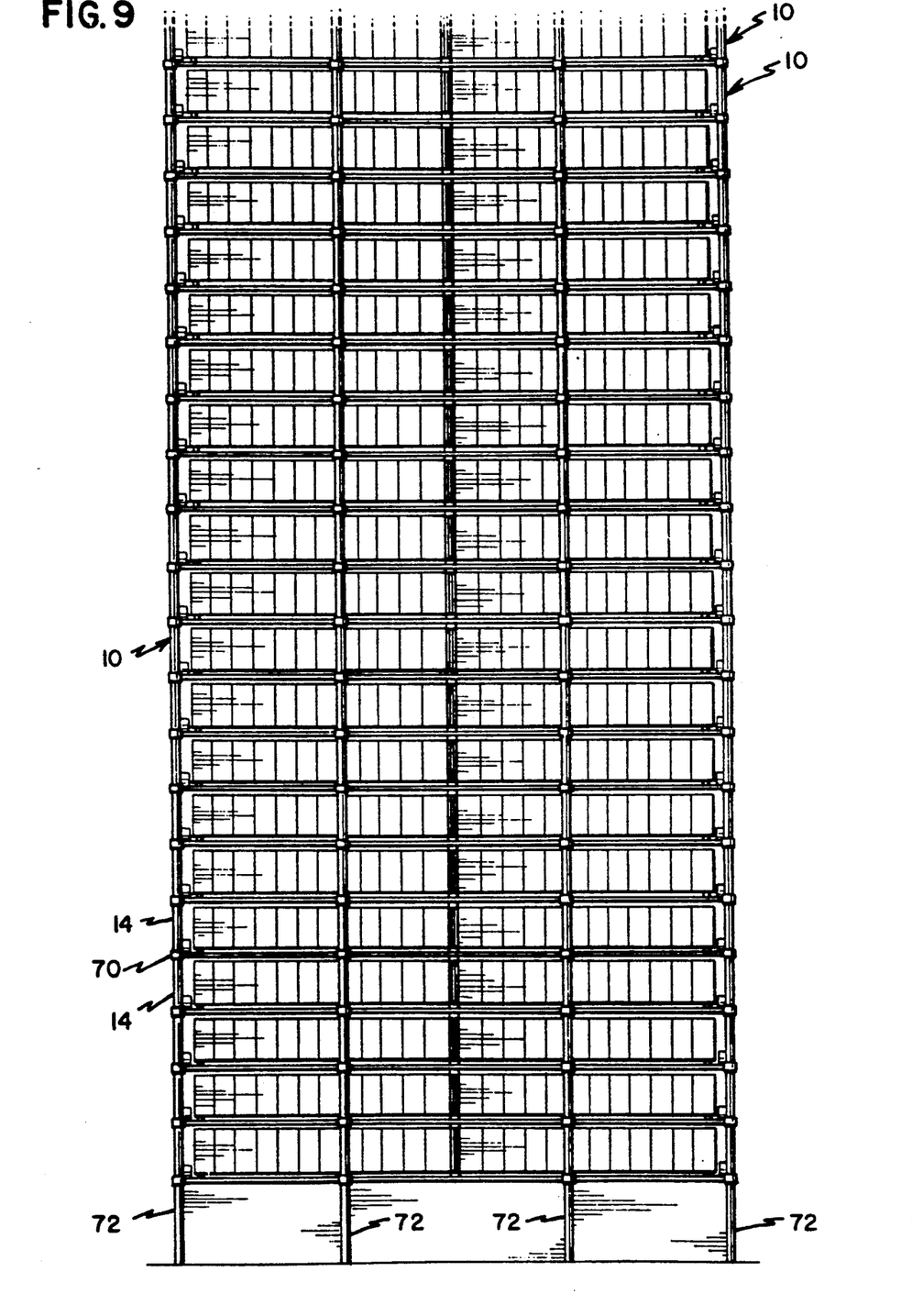
FIG. 9 shows a stack of the windmills in accordance with the present invention.

FIG. 9 shows a plurality of windmills 10 stacked one atop the other. Stacking is accomplished by coupling proximate radial support posts 14 together with a stacking means including a coupling member 70. Disposed at the lower end of the stack are columns 72. The stack can be as high as the structural strength of the supporting members allow.

Figure 10:
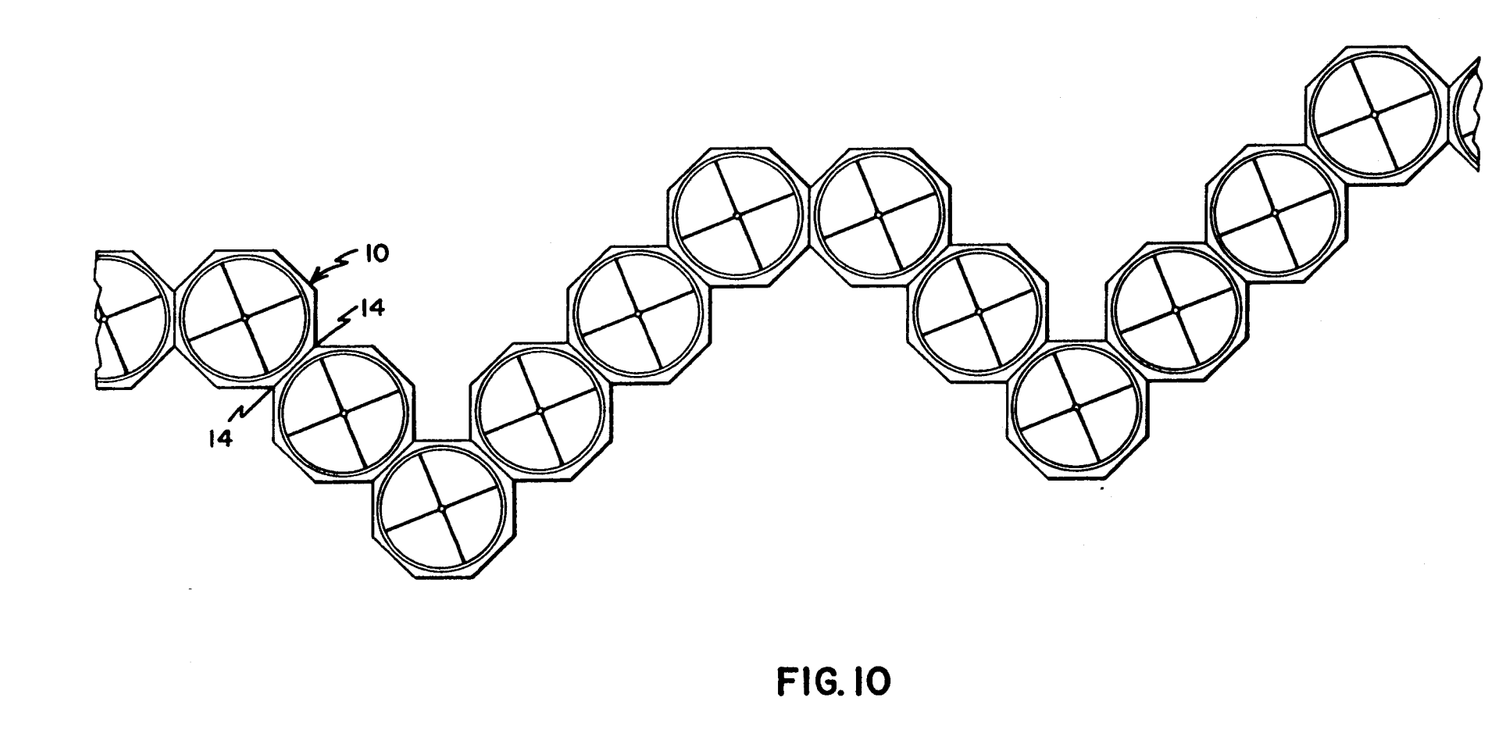
FIG. 10 shows a view from above of a plurality of the windmills.

FIG. 10 shows a view from above a plurality of windmills 10 or stacks of windmills arranged so that two radial support posts 14 are common to adjacent windmills 10. The windmills and/or stacks of windmills 10 are arranged in a serpentine pattern as shown in FIG. 7 to enhance structural integrity while maintaining exposure to the wind.

In use, the windmill 10 is placed in an area sufficiently clear of obstructions that wind can reach wind vanes 28 rotatably mounted on beams 22. As shown in FIGS. 1 and 2, beams 22 are rotating about center support post 12 in a clockwise direction (rotation in the counterclockwise direction is also possible with readily apparent modifications of the windmill). The vane release slides 36 and 37 are in the first confined position so that vanes 28 are only free to rotate proximately 180°. In FIGS. 1 and 2, wind vanes 28 shown on beam 22 disposed to the left are in a closed position, wherein upper ends 58 and lower ends 60 of stays 56 are engaged with tabs 52. When in the closed position, vanes 28 present a proximately continuous surface between center support post 12 and annular ring 18 to catch the incident wind (wind direction showed by arrows moving from the foreground to the background in FIGS. 1 and 2). Wind vanes 28 mounted to beam 22 disposed to the right in FIGS. 1 and 2 are shown in a open position. When in the open position, vanes 28 present a substantially open expanse facing the wind between center support post 12 and annular ring 18 to allow beam 22, having vanes in the open position, to rotate into the wind with reduced surface area to decrease resistance.

Wind vanes 28 on beams 22, disposed to the foreground and to the background in FIGS. 1 and 2, are shown in the closed position. As the windmill continues to rotate in the clockwise direction, beam 22, now in the foreground, will present a proximately continuous surface of wind vanes 28 to catch the wind. Wind vanes 28 of beam 22, shown in the background, will be pushed open by the wind as the beam continues to rotate. This pattern of opening and closing vanes 28 will continue indefinitely until the wind stops blowing or vane release slides 36 and 37 are moved into the free position. It should be noted that in FIGS. 1 and 2, although not shown, tabs 52 of release slides 36 and 37 are in the confined position, disposed toward the direction of rotation relative to upper ends 58 and lower ends 60 of stays 56.

Annular ring 18, which supports the second ends of beams 22, rotates about post 12 as beams 22 rotate about post 12. As shown in FIGS. 3A and 3B, annular ring 18 is mounted on wheels 20 which are mounted for rotation and operably connected to generator 29 by shaft 42. Thus, the rotation of annular ring 22 results in the rotation of wheels 20 and shafts 42 to generate electricity which is delivered to another location by busses 40. It is anticipated that the electricity generated by generators 29 can be immediately used or stored. Means of storage might include the hydrolysis of water, which would break water molecules into hydrogen and oxygen. The hydrogen and oxygen could be used as fuel to be consumed at a later time and/or at a remote location. Other storage means such as batteries or capacitors might also be used, but may be inefficient for storage of larger amounts of energy. In the preferred embodiment, the storage means might be placed beneath stacked windmills in the space proximate column 72, as shown in FIG. 9.

As mentioned above, the air valves 61 or 62' of the trip levers 34 or 34' are controlled by controller 92. The operation of controller 92 will be described herein with respect to air valve 62 of trip levers 34. The operation of air valves 62' of trip levers 64' is essentially the same, except as noted below.

If the wind speed, as detected by the anemometer 88, exceeds a predetermined magnitude (based upon the structural strength of windmill 10), controller 92 will send a signal to the trailing air valve 62 of each trip lever 34 to retract corresponding actuator rods 64 to move trip lever face 64 into the position shown in FIG. 5B to slide vane release slides 36 and 37 into the second free position, as described above.

When the wind speed drops below another predetermined level, release slides 36 and 37 are returned to the confined position from the free position. Since wind vanes 28 are free to rotate 360° when in the free position, beams 22 and, thus, vane release slides 36 and 37 will not rotate to trip levers 34 by wind action. Thus, controller 92 activates a motor winding on one of the generators 29 to drive corresponding wheel 20 to rotate vane release slides 36 and 37 to trip levers 34.

To return vane release slides 36 and 37 to the first confined position, actuator rod 64 of leading air valve 62 (that is, the air valve 62 of trip lever 34 which roller 38 passes first as beam 22 rotates) must be substantially retracted and actuator rod 64 of trailing air valve 62 must be partially retracted, as shown in FIG. 5C. However, this repositioning of rods 64 of trip levers 34 must be done sequentially, one trip lever at a time. Not all of the trip levers can be positioned to move release slides 36 and 37 at the same time. If this were done, the wind vanes 28 on opposite beams 22 would be confined on the same side of opposite beams 22 rather than on opposite sides of opposite beams 22. Thus, rather than beams 22 rotating about the center support post 12, the wind force on vanes 28 disposed on opposite beams 22 would tend to counteract each other.

The first trip lever to be activated is preferably the first trip lever 34 disposed counterclockwise from or to the left of the direction of the wind (assuming the rotation of beams 22 is clockwise; if the rotation is to be counterclockwise, the first trip lever 34 would be to the right). To accomplish this, wind direction indicator 90 sends a signal to controller 92. The controller 92 then moves the first trip lever 34 disposed counterclockwise from the direction of the wind to the position shown in FIG. 5C and described in the preceding paragraph. Once the first roller 38 passes roller sensor 74, the controller 92 moves the second and adjacent trip lever 34 disposed clockwise from the first trip lever 34 to the position shown in FIG. 5C. Once the first roller 38 passes sensor 74 on the second trip lever 34, the third and adjacent trip lever 34 disposed clockwise from the second trip lever 34 is moved to the position shown in FIG. 5C. This process is continued until the fourth and final trip lever 34 is moved to the position shown in FIG. 5C, at which point all wind vanes 28 are in the confined position. When the first roller 34 passes sensor 74 of the fourth trip lever 34, each sensor 76 will detect the adjacent trip lever face 66, and controller 92 will move each trip lever 34 to the neutral position shown in FIG. 5A and switch off the motor.

Trip lever embodiment 34' operates in substantially the same way, except that rather than having three different positions, it has only two, as shown in FIGS. 6A, 6B, and 6C. The functioning of trip lever 34' in FIGS. 6A, 6B, and 6C correspond to the functioning of trip lever 34 in FIGS. 5A, 5B and 5C, respectively.

While the present invention has been described in connection with the preferred embodiment thereof, it will be understood many modifications will be readily apparent to those skilled in the art, and this application is intended to cover any adaptations or variations thereof. It is manifestly intended this invention be limited only by the claims and equivalents thereof.

What is claimed is:

1. A windmill comprising:
   an approximately vertical center support post;
   a plurality of wheels, each wheel rotatably mounted on a separate horizontal axis, each axis being radially disposed about the center post;
   a horizontal annular ring, being radially disposed about the center support post, the ring having an inverted channel section adapted to engage the wheels;
   a first and second set of parallel beams, each set including an upper beam and a lower beam, the first set of beams substantially perpendicular to the second set of beams, the beams intersecting at the vertical center support post and attached to the annular ring; and
   a plurality of vanes pivotally mounted between the upper and lower beams each having a vertical axis, the vanes adapted to swing to a first open position when travelling against the wind and adapted to swing into a second closed position when engaged in a downwind position.

2. The windmill in accordance with claim 1 further comprising support means for supporting the post and wheels, so that the windmill can be elevated above ground level.

3. A windmill in accordance with claim 1, further comprising a plurality of like windmills stacked one atop the other.

4. A windmill in accordance with claim 1, further comprising a tripping lever for alternatively placing the vanes in a confined condition in which each vane can rotate approximately 180° about the vertical axis, to an unconfined condition in which each vane can rotate approximately 360° about the vertical axis.

* * * * *